United States Patent

[11] 3,627,888

| [72] | Inventor | Ralph Salkin |
| | | Kinnelon, N.J. |
| [21] | Appl. No. | 757,100 |
| [22] | Filed | Sept. 3, 1968 |
| [45] | Patented | Dec. 14, 1971 |
| [73] | Assignee | Corn Products Company |

[54] METHOD FOR OBTAINING CASCAROSIDES FROM CASCARA BARK
1 Claim, No Drawings

[52] U.S. Cl. .................................................... 424/195
[51] Int. Cl. .................................................... A61k 27/14
[50] Field of Search ......................................... 424/195, 366; 260/210

[56] References Cited
UNITED STATES PATENTS

| 1,167,230 | 1/1916 | Tambach................. | 424/195 |
| 2,552,896 | 5/1951 | Lee et al. ................. | 260/210 |
| 2,938,832 | 5/1960 | Huggins et al. ........... | 424/366 |

OTHER REFERENCES

Weissberg, Technique of Organic Chemistyr, Vol. III, pp. 474–479

*Primary Examiner*—Albert T. Meyers
*Assistant Examiner*—Daren M. Stephens
*Attorneys*—Frank E. Robbins, James L. Bailey, Janet E. Price, Robert D. Weist and Martha A. Michaels

ABSTRACT: Covers a method for obtaining cathartic cascarosides from a cascara bark. Essential steps include adding a methanol extract of said bark to hot isopropyl alcohol, concentrating the solids content of said resultant solvent mixture, cooling said mixture and removing the desired cascaroside solids from the mother liquor.

METHOD FOR OBTAINING CASCAROSIDES FROM CASCARA BARK

The cascaroside solids obtained from cascara sagrada bark are known to possess cathartic activity and are useful as mild laxatives. These cascarosides are mixture of materials, one of which is referred to as casanthranol. It is believed that the casanthranol accounts for practically the whole of the laxative effect of the cascarosides contained in the bark. The casanthranol glycoside has been disclosed and characterized in a prior art patent.

The just-mentioned patent also discloses a method of obtaining the desired casanthranol. Essentially, this method consists of extracting the bark with a solvent such as benzene, preferably containing a small amount of ethanol to remove anthraquinones, fats, pigments, etc. The resultant defatted marc is then extracted by percolation or maceration with methanol. The methanol concentrate is then added to a ketone or ester solvent in which the casanthranol is insoluble and precipitates out of solution. The desired casanthranol solids are then removed by filtration or the like.

The above proposed procedure has one extremely important drawback in that a great proportion of the casanthranol, say about 40 percent remains in the mother liquor after removal of the casanthranol solids. In order to increase the efficiency of the overall process in terms of total yield the mother liquor is then treated by a complicated scheme involving a number of steps. Essentially, the mother liquor is evaporated, taken up in methanol, and treated with lead acetate to provide a precipitate. The precipitate is resuspended in methanol and treated with hydrogen sulfide to in turn yield lead sulfide which is filtered off. The resultant filtrate contains the desired remaining casanthranol. As is clearly evident this procedure of recovering additional casanthranol is time consuming, expensive and difficult to carry out.

It would therefore be a distinct advance in the art if a simple procedure for obtaining cascarosides from cascara bark were available in which relatively high yields of the wanted cascaroside material could be realized without resort to the above complicated scheme or others.

It therefore becomes an object of the invention to provide an improved method of removing cascarosides from cascara sagrada bark.

Another object of the invention is to provide a simple, yet efficient method of recovering said cascarosides wherein the overall yield of cascarosides is relatively high.

A still further object of the invention is to provide a method of recovering wanted cascarosides from cascara bark by resort to simple solvent techniques, which overall process is carried out in a minimum of purification steps.

Other objects will appear hereinafter.

BROAD DESCRIPTION OF THE INVENTION

In accordance with the invention, a new method of recovering cascarosides from cascara sagrada bark has been discovered. In its broadest aspects the invention comprises the steps of providing a concentrated methanol extract of cascara bark, adding said methanol extract to hot isopropyl alcohol and distilling off a portion of the combined solvent mixture of isopropanol and methanol. It is greatly preferred that at least 75 percent of the methanol present be removed by distillation. The mixture is then cooled and the desired cascaroside solids removed from the cooled mother liquor. The removal of cascarosides from mother liquor is preferably carried out by filtration techniques although centrifugation is also entirely satisfactory here.

In a preferred embodiment the above mother liquor is then further concentrated by distilling off a portion of the solvent present and cooling the thus concentrated mother liquor. A second crop of cascaroside solids is then removed from this mother liquor. If the steps of the invention are carefully followed, as briefly outlined above, yields as high as 90–95 percent of the available cascarosides originally present in the methanol concentrate can be achieved. However, normally the average yield runs from about 75 percent to about 95 percent of theoretical.

DETAILED DESCRIPTION OF THE INVENTION

The first step in the invention is to provide a concentrated methanol extract of cascara bark. This may be carried out via a number of methods though the following prior art method is preferred. Essentially this procedure comprises extracting the bark with a number of different solvents to remove fats, anthraquinones, pigments, chlorophyll, etc. Such solvents as acetone, methyl ethyl ketone, ether, petroleum ether, ethylene dichloride, chloroform and carbon tetrachloride may be used here. Benzene is the preferred solvent extractant. In many cases an alcohol such as ethanol is used in conjunction with one or more of the just enumerated solvents.

The thus defatted marc is then extracted by percolation or maceration with methanol. One particular method is to separate the marc from the extract, dry it and then pack it in a percolator and extract to exhaustion with methanol. Thereafter the methanol percolate is concentrated. Generally after concentration a methanol percolate or extract contains 25–45 percent by weight of solids, and more often contains 30–40 percent by weight of desireable cascaroside containing solids.

The concentrated methanol extract is then quenched by addition to hot isopropyl alcohol. In the usual case the isopropyl alcohol is in a boiling state when the methanol extract is added thereto. This step is a particularly critical one in practice of the overall process of the invention. It was a somewhat unexpected discovery at this point to note that other alcohols similar to isopropanol, including such lower alkyl alcohols as ethanol, butanol, etc., when employed in this step did not give as efficient results in terms of overall yield of cascarosides compared to use of isopropanol. It is believed that use of isopropanol in this step helps one to achieve overall excellent product yields due to the fact that the cascarosides readily crystallize from this particular alcohol upon cooling. Generally after addition of the methanol extract to the isopropyl alcohol the solids content of the combined solvent mixture ranges from about 3 percent by weight to about 7 percent by weight. Typically, the solids content is about 5 percent.

The next step in the invention is to concentrate the combined solvent mixture, essentially by removal of the bulk of the methanol via distillation. Usually, at the completion of this step at least 75 percent of the methanol originally present is distilled off. In a typical run about 90 percent of the methanol is removed. It is understood, of course, that during addition of the methanol concentrate to hot or boiling isopropanol distillation of the methanol is already initiated. In some cases after the methanol addition is completed little, if any, further distillation need be carried on. Generally, however, some further distillation is effected after completion of the methanol addition to isopropanol. Also, during the distillation step some of the higher boiling isopropyl alcohol is also taken off. In any event, after the distillation step is completed the solids content in the methanol-isopropyl alcohol mixture remaining is usually approximately doubled. Generally the mixture at this point contains 8–12 percent by weight of solids, and typically about 10 percent solids weight.

At this point it is preferred, though not essential, to filter the solvent mixture while still hot. This step aids in removing unwanted materials such as pigmented substances or color bodies and thus particularly improves the color of the final desired product. A small amount of cascarosides are lost in this step but overall process benefits accrue in terms of a more highly purified product if this particular expedient is carried out.

The next step in the invention involves removal of precipitated cascaroside solids from the cooled isopropanol-methanol solvent. The hot solution may be allowed to cool upon standing or may be externally cooled by withdrawal of heat. Generally the mixed solvent at this point is cooled to from about 10° C. to about 30° C., and most often merely allowed to cool to room temperature. At this point the cascaroside solids are removed from the mother liquor. The removal may be effected by such conventional means as centrifugation, filtration, etc. It is preferred that the solids by merely filtered from the mother liquor.

Generally after filtration of the cascaroside solids the mother liquor contains from about 3 to about 7 percent by weight of dissolved solids, usually about 5 percent. Thus, it is greatly preferred that the mother liquor be reconcentrated again, say up to about 8–12 percent solids by removal of additional solvent, cooled, and a second crop of solid cascarosides removed from the remaining mother liquor. The mother liquor at this point contains minimal amounts of desired product and can generally be discarded. As mentioned above, by following the just outlined steps one can realize an overall yield of 90 percent or more of the available cascarosides.

The following examples typically illustrate the process of the invention. All parts and percentages are in terms of weight.

EXAMPLE I

Thirty grams of a methanol extract of cascara bark which by assay (J. Pharm. Pharmacol., 1964, 16, 450–454) contained 5.2 grams of cascarosides per 100 ml. of methanol was slowly added to 600 ml. of boiling isopropanol with vigorous stirring. After addition of the methanol the distillation was continued until the total volume had been reduced to 300 ml. The boiling solution was filtered on a preheated funnel and insolubles rinsed with 25 ml. of hot isopropanol. The insolubles were discarded. The isopropanol wash was added to the filtrate which was then cooled to 5° C. for 2 hours. Thereafter the solids were filtered out and the resulting cake dried under vacuum at 40°–50° C.

The filtrate was concentrated to one-half the original volume, again cooled for 2 hours to 5° C. and a second crop filtered and dried as above.

The two crops obtained above as buff yellow water-soluble powders, in 12.0 and 5.4 gram yields respectively were then combined. They contained 27.9 percent cascarosides by assay (about 4.85 grams) or 93 percent of the cascarosides available in the original methanol extract.

It was interesting to note that an identical aliquot worked up by the above discussed prior method, that is, by addition of the methanol extract to acetone yielded 14.0 grams of casanthranol assaying 21.5 percent cascarosides. This was about 58 percent of cascarosides originally available. Thus, by utilizing the method of the instant invention one can realize about a 35 percent increase in total yield compared to the prior art method.

EXAMPLE II

Forty grams of a methanol concentrate from cascara bark which by assay contained 6.92 grams of cascarosides in 90 milliliters of anhydrous methanol was added slowly to 500 cc. of boiling isopropanol over 5 minutes. 350 ml. of distillate was collected during the methanol addition and thereafter. The hot slurry was colled with stirring to 5°–10° C. for 2 hours, filtered, and washed with 50 ml. of cold isopropanol. The filter cake was dried, yielding 21.0 grams as a first crop. The mother liquor was then concentrated to one-half volume, cooled, etc. in the manner set out above and a second crop of cascaroside was obtained in an amount of 7.0 grams. The combined two crops obtained as a dark buff yellow powder contained 22 percent cascarosides by assay. This was equivalent to about 6.3 grams of recovered cascarosides or 91.3 percent of cascarosides originally available.

This example demonstrates that the step of filtering off pigments, etc. from a hot isopropanol sample is not essential, and good yields are still realized in the absence of this step. However, the final product in absence of the hot filtration step is of a slightly darker color than like samples obtained via benefit of this particular step.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A method for obtaining cathartic cascarosides from cascara sagrada bark which comprises the steps of:
   a. extracting said bark with solvent selected from the group consisting of acetone, methyl ethyl ketone, ether, petroleum ether, ethylene dichloride, chloroform, carbon tetrachloride, and benzene to remove anthraquinones, pigments, fats and other unwanted substances to provide a marc of said bark,
   b. extracting the resulting marc with methanol to provide a methanol extract containing 25–45 percent by weight of solids content,
   c. adding said methanol extract to boiling isopropyl alcohol to provide a mixed solvent of isopropyl alcohol and methanol having a 3–7 percent by weight solids content,
   d. distilling off a portion of the combined solvent mixture of isopropyl alcohol and methanol including removal of at least 75 percent of methanol present until the solids content after distillation is 8–12 percent by weight,
   e. cooling said solvent mixture,
   f. filtering off a first crop of desired cascaroside solids from a mother liquor,
   g. further concentrating said mother liquor by distilling off a portion of the solvent present,
   h. cooling the concentrated mother liquor,
   i. filtering off a second crop of cascaroside solids,
   j. and combining the two crops of cascaroside solids.

* * * * *